(12) United States Patent
Bauer et al.

(10) Patent No.: US 8,080,750 B2
(45) Date of Patent: Dec. 20, 2011

(54) DEVICE FOR MOUNTING A SWITCH OR THE LIKE ON A MOUNTING PLATE

(75) Inventors: Heinz Bauer, Taufkirchen (DE); Andreas Bauer, Kirchberg (DE)

(73) Assignee: Schaltbau GmbH, Munich (DE)

( * ) Notice: Subject to any disclaimer, the term of this patent is extended or adjusted under 35 U.S.C. 154(b) by 99 days.

(21) Appl. No.: 12/616,059

(22) Filed: Nov. 10, 2009

(65) Prior Publication Data

US 2010/0116957 A1     May 13, 2010

(30) Foreign Application Priority Data

Nov. 13, 2008  (DE) .......................... 10 2008 057 147

(51) Int. Cl.
  *H01H 9/00*    (2006.01)
(52) U.S. Cl. ................. 200/296; 248/222.52; 248/224.7
(58) Field of Classification Search ............ 248/222.14, 248/222.52, 222.31, 224.7, 224.8; 200/293, 200/294, 296

See application file for complete search history.

(56) References Cited

U.S. PATENT DOCUMENTS

| 7,217,897 B2 * | 5/2007 | Mattarelli ..................... 200/329 |
| 7,741,572 B2 * | 6/2010 | Mattlar et al. ............. 200/50.32 |
| 2007/0194190 A1 * | 8/2007 | Kurth ....................... 248/222.52 |

FOREIGN PATENT DOCUMENTS

| DE | 28 07 798 | 10/1978 |
| DE | 82 07 613 | 11/1982 |
| DE | 34 06 567 A1 | 2/1984 |

* cited by examiner

*Primary Examiner* — Ramon Ramirez
(74) *Attorney, Agent, or Firm* — Kilpatrick Townsend & Stockton LLP

(57) ABSTRACT

The present invention relates to a device for mounting a switch or the like on a mounting plate. The switch comprises a housing with a housing top side supported on the back side of the mounting plate, a fastening protrusion including fastening means, as well as a plurality of resilient tongues, each having a locking protrusion. The fastening protrusion and the resilient tongues are inserted for mounting purposes from behind into an opening of the mounting plate, with the locking protrusions locking in place with the front edge of the opening. Furthermore, the device comprises a fastening element that can be mounted from the front side of the mounting plate and cooperates with the fastening means of the fastening protrusion. According to the invention the resilient tongues extend from the housing top side substantially in vertical direction and are spaced apart from the fastening protrusion. Moreover, according to the invention the fastening element is formed by a sleeve that can be inserted from the front side of the mounting plate into the opening of the mounting plate.

14 Claims, 4 Drawing Sheets

DEVICE FOR MOUNTING A SWITCH OR THE LIKE ON A MOUNTING PLATE

CROSS-REFERENCE TO RELATED APPLICATIONS

This application claims the priority of German Application No. 10 2008 057 147.4, filed on Nov. 13, 2008, the disclosure of which is incorporated herein by reference.

BACKGROUND OF THE INVENTION

The present invention relates to a device for mounting a switch or the like on a mounting plate. The switch normally comprises a housing with a housing top side supported on the back side of the mounting plate, a fastening protrusion including fastening means, as well as a plurality of resilient tongues, each having a locking protrusion. For mounting purposes the fastening protrusion and the resilient tongues are inserted from behind into an opening of the mounting plate. The locking protrusions thereby lock in place with the front edge of the opening. Furthermore, the device normally comprises a fastening element that can be mounted in a completing way from the front side of the mounting plate and cooperates with the fastening means of the fastening protrusion.

Such a device is e.g. known from DE 28 07 798 C2. The fastening protrusion is there configured as a sleeve. The resilient tongues are part of the sleeve wall and are each provided at their upper end with a locking protrusion. The sleeve is seated on the housing top side of the housing, which is here called a module carrier. For mounting purposes the sleeve is inserted with the locking protrusions from behind into an opening of the mounting plate, the locking protrusions locking in place with the upper edge of the opening. The module carrier is here for example supported by a resilient element on the back side of the mounting plate. Moreover, the sleeve comprises further locking protrusions that project beyond the upper edge of the mounting plate. The further locking protrusions serve to fix a cover.

DE 82 07 613 U1 reveals a further fastening device for a rotary switch or the like. The fastening protrusion of this fastening device is also designed as a sleeve comprising a plurality of locking protrusions, which are here called claws. The sleeve is inserted from behind through a bore of a mounting plate, which is designated as a carrier, the claws being engaged on the front side by resilience. It is here also suggested that the sleeve should comprise further claws that project beyond the upper rim of the carrier bore and serve to retain a front plate covering the carrier bore, or a decorative ring. The switch is clamped with a tension ring against the back side of the carrier.

A drawback of these devices known from the prior art is that a front plate mounted from the front or a mounted decorative ring or trim ring, also called a fastening element, must be made of a material with relatively high strength because this fastening element is held by locking protrusions that project beyond the upper rim of the mounting plate. Hence, the fastening element thereby forms a relatively large elevation for example of a control panel, which may be aesthetically undesirable. Moreover, this drawback may entail ergonomic deficiencies. Another drawback is that the tongues of the locking protrusions are relatively hard-sprung if a certain stability of the sleeve is to be ensured because the tongues themselves are part of the sleeve. A disassembly of the switch is therefore difficult and may also lead to irreparable damage in the case of correspondingly brittle materials. Likewise, the assembly of the switch may also turn out to be difficult, depending on the type of mounting plate.

SUMMARY OF THE INVENTION

It is therefore an object of the present invention to indicate a device for mounting a switch or the like on a mounting plate so as to facilitate assembly and disassembly of the switch. Moreover, the other drawbacks of the prior art shall be overcome.

To achieve this object, there is provided a device for mounting a switch if the resilient tongues extend from the housing top side substantially in a vertical direction and are spaced apart from the fastening projection, and the fastening element is formed by a sleeve that is insertable from the front side of the mounting plate into the opening of the mounting plate. This makes the stability of the fastening protrusion independent of the tongues of the locking protrusions. The tongues can thus be configured to be relatively long, which entails ease of resilience of the tongues. This facilitates the assembly and disassembly of the switch. The fastening means can be mounted for holding the fastening element and the sleeve, respectively, also laterally on the fastening protrusion, whereby the minimum thickness of a decorative ring or the like is reduced.

In a preferred embodiment the opening of the mounting plate is formed by a bore.

Advantageously the sleeve comprises one cut-out per tongue. It turns out to be particularly advantageous when the outer diameter of the sleeve is about the diameter of the bore and if there is only a minor play between sleeve and bore. This ensures a firm seat of the sleeve and also of the switch, respectively. As an alternative, the outer diameter of the sleeve could also be smaller, so that the sleeve can be inserted or screwed into the gap between the fastening protrusion and the tongues.

In a further preferred embodiment, the sleeve is configured in the manner of a bayonet lock. The fastening means of the fastening protrusion are here formed by a plurality of nipples which cooperate with corresponding recesses of the sleeve. The sleeve is first introduced by insertion and is subsequently locked with a slight rotational movement by the nipples of the fastening protrusion and secured against falling out. Advantageously, the sleeve is provided on the cut-outs with wedge-shaped extensions which press the tongues of the locking protrusions by rotation of the bayonet lock against the rim of the opening.

In a further preferred embodiment, the sleeve comprises a decorative ring. The decorative ring is arranged on the upper end of the sleeve, thereby forming the only visible part of the sleeve after mounting. Advantageously, the decorative ring also serves supporting purposes against the front side of the mounting plate. Thus the hold of the switch on the mounting plate, which is first provisionally given for mounting by way of the locking protrusions, is intensified by the decorative ring. Advantageously, the decorative ring therefore comprises grooves that serve to accommodate the locking protrusions. These grooves are provided on the bottom side and thus in the support area of the decorative ring. It has here turned out to be particularly advantageous when the grooves extend in spiral form, whereby the locking protrusions are pressed outwards upon rotation of the sleeve. The tongues of the locking protrusions are thereby prevented from rebounding, whereby a disengagement of the locking protrusions is ruled out.

In a further preferred embodiment the tongues are uniformly arranged and distributed over the circumference of the bore. Preferably, the housing exactly comprises four tongues.

This ensures an adequate provisional hold on the mounting plate by engagement of the locking protrusions and simultaneously guarantees a good stability of the sleeve by just four cut-outs.

In a further preferred embodiment the device further comprises a plurality of threaded pins seated in the housing. These threaded pins can be moved out of the housing top side by rotation and thereby serve to support the housing top side on the back side of the mounting plate. The tightening of the threaded pins caused by rotation is normally carried out as the last mounting step.

BRIEF DESCRIPTION OF THE DRAWINGS

A preferred embodiment shall now be explained in more detail with reference to drawings, in which.

DESCRIPTION OF THE PREFERRED EMBODIMENTS

Figure 1:
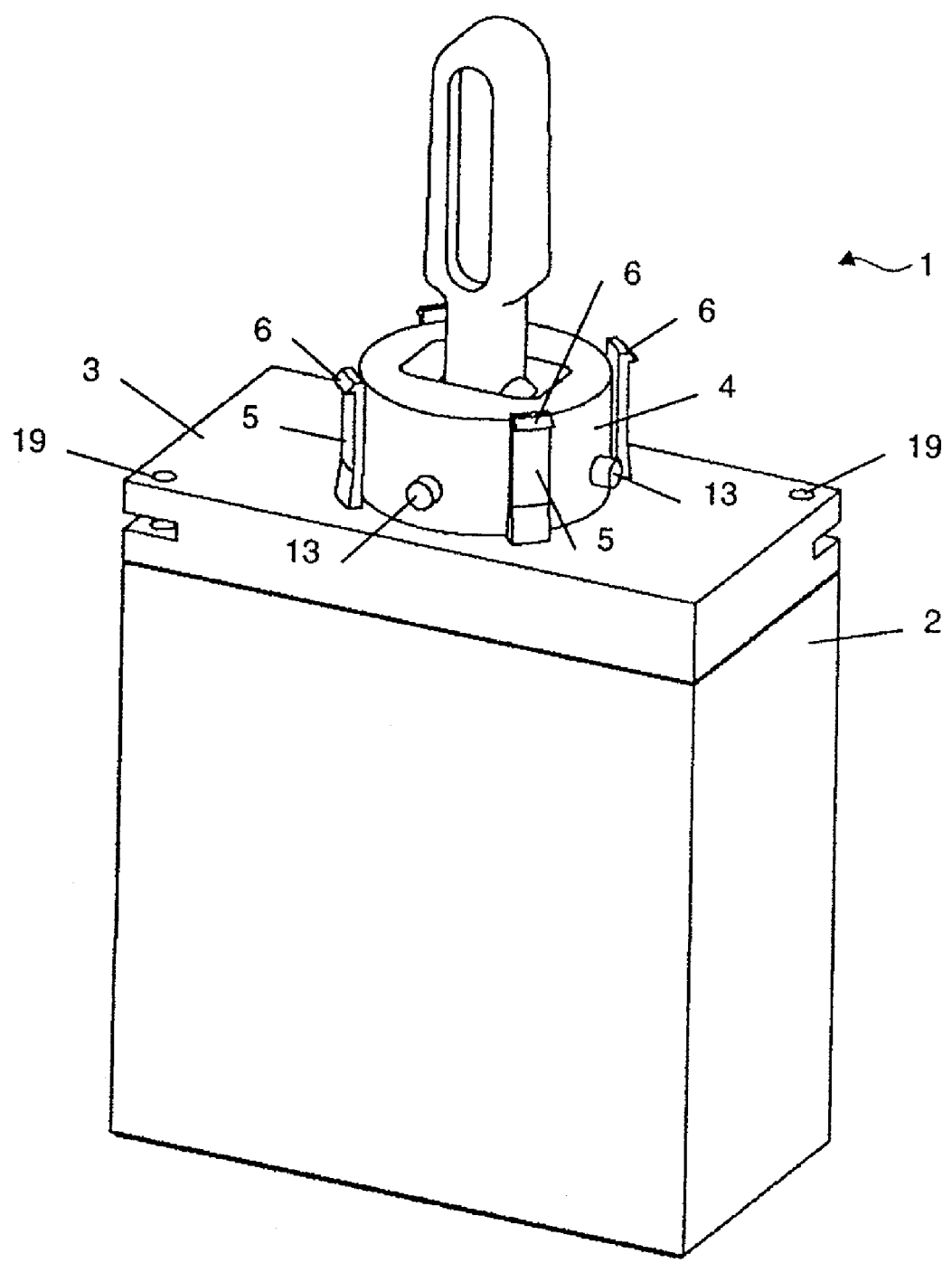
FIG. 1 shows a switch with a configuration according to the invention of fastening protrusion and tongues.

As for the whole further description, if reference numerals are included in a figure for the sake of graphical clarity, but if these are not explained in the associated text of the description, reference shall be made to their explanation given in preceding descriptions of the figures.

Figure 2:
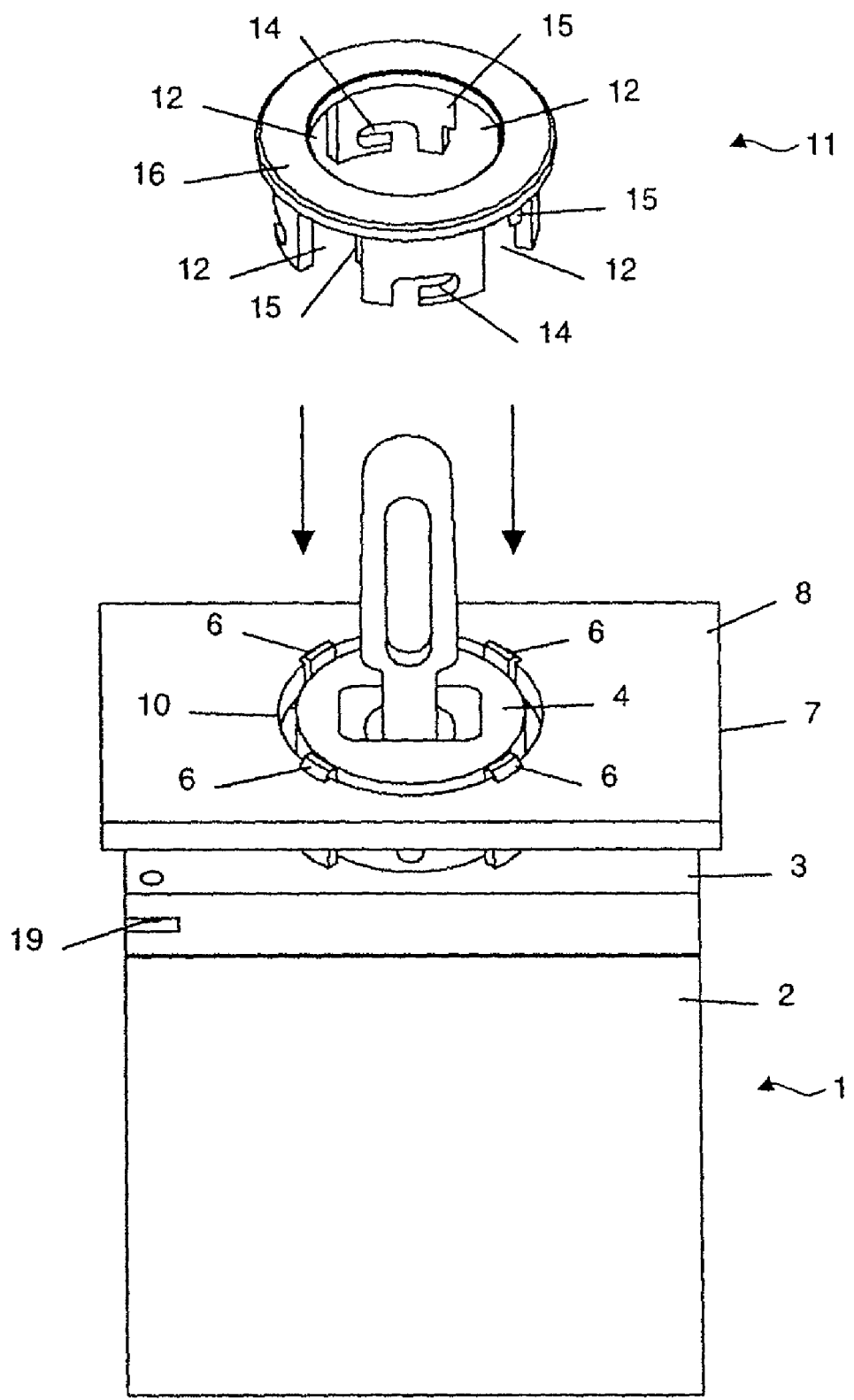
FIG. 2 shows the switch of FIG. 1 inserted into the opening of a mounting plate, with a sleeve to be inserted.

FIG. 1 shows a switch 1 in a design corresponding to the device according to the invention, in an oblique view. The switch 1 comprises a housing 2 with a housing top side 3, a fastening protrusion 4 and four evenly distributed resilient tongues 5, each having a locking protrusion 6. The fastening protrusion 4 is designed as a circular round base and constitutes the bearing of the operating lever (not designated) of the switch 1 at the same time. The four resilient tongues 5 extend vertically from the housing top side 3 in the direction of the axis of the circular round fastening protrusion 4 and are spaced apart therefrom. Furthermore, the fastening protrusion 4 comprises four nipples 13 that are evenly distributed over the circumference and serve to hold the sleeve 11, which is shown in FIG. 2 for the first time and configured in the manner of a bayonet lock. Moreover, two accommodating means for accommodating threaded pins are provided with reference numeral 19 in FIG. 1.

FIG. 2 shows the switch of FIG. 1 already in the pre-mounted state. Fastening protrusion 4 and tongues 5 have already been inserted from behind into a bore 10 of the mounting plate 7. The locking protrusions 6 arranged at the end of the tongues are thereby locked in place with the upper edge of the bore 10 and are thus positioned on the front side 8 of the mounting plate 7. Furthermore, FIG. 2 shows the sleeve 11, which is still to be inserted. The outer diameter of the sleeve 11 is approximately the same as the diameter of the bore 10 and the sleeve 11 comprises a cut-out 12 for each tongue 5. It can thus be inserted from above into the clearance between the fastening protrusion 4 and the bore 10. The nipples 13 shown in FIG. 1 thereby engage into the four recesses 14 of the sleeve 11. With a subsequent rotation of the sleeve 11 configured in the manner of a bayonet lock is locked. Moreover, owing to the rotation the tongues 5 are pressed by the wedge-shaped extensions 15 of the sleeve 11 to the outside against the edge of the bore 10, whereby a possible disengagement of the locking protrusions 6 is prevented. Furthermore, the sleeve 11 comprises a decorative ring 16, which rests with its bottom side at least in part on the mounting plate 7. The provisional hold provided by the engagement of the locking protrusions 6 is thereby intensified.

Figure 3:
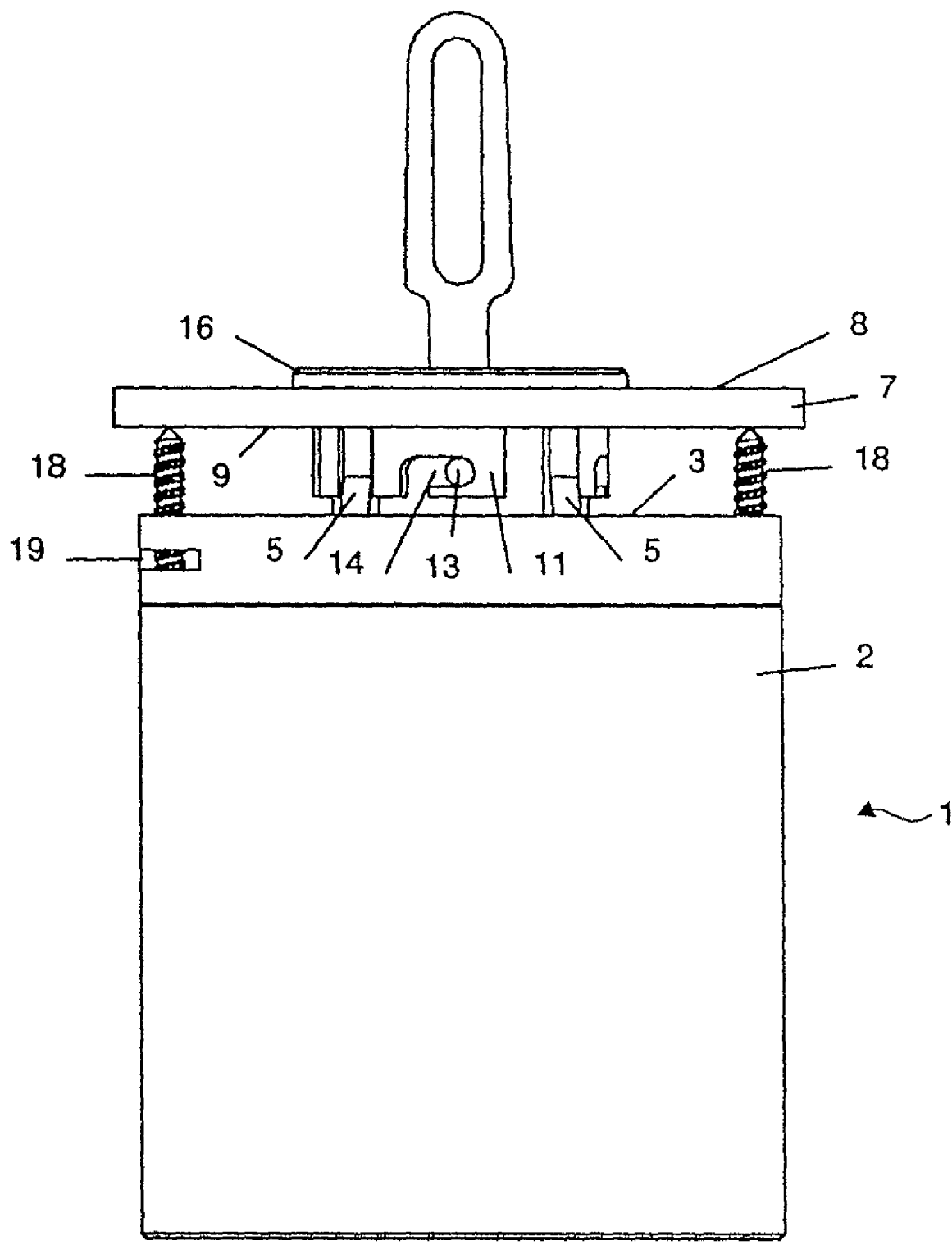
FIG. 3 is a side view of the finish-mounted switch of FIGS. 1 and 2.

FIG. 3 shows a side view of the finish-mounted switch illustrated in FIGS. 1 and 2. In a last mounting step the two threaded pins 18, which are seated in the accommodating means 19 of the housing 2, are tightened by rotation, thereby supporting the switch 1 on the back side 9 of the mounting plate 7.

Figure 4:
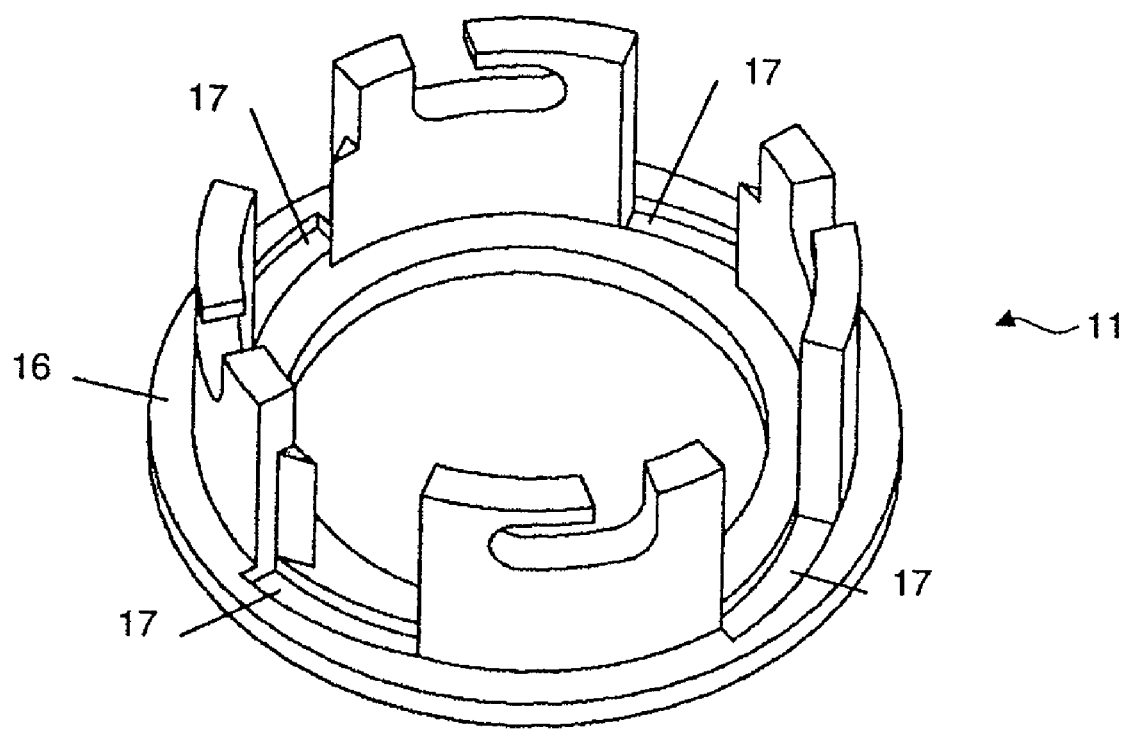
FIG. 4 is an oblique view of the sleeve according to the invention of FIGS. 2 and 3.

FIG. 4 shows an oblique bottom view of the sleeve 11 illustrated in FIGS. 2 to 3. It can be seen that the decorative ring 16 is provided on its bottom side with four spirally outwardly oriented grooves 17 that serve to accommodate the locking protrusions 6. Due to the spiral design of the grooves 17 the locking protrusions 6 are pressed in radial direction outwards against the edge of the bore 10 upon locking of the sleeve 11 configured in the manner of a bayonet lock. Hence, the grooves 17 provide further protection against any disengagement of the locking protrusions 6.

The invention claimed is:

1. A combination of a switch and a fastening element for mounting the switch on a mounting plate, wherein the mounting plate comprises a front side, a back side and an opening;
   the switch comprising:
      a housing with a housing front side configured to be supported on the back side of the mounting plate;
      a fastening protrusion including fastening means, and a plurality of resilient tongues, each having a locking protrusion, wherein the resilient tongues extend from the housing front side substantially in a forward direction and are spaced apart from the fastening protrusion, the fastening protrusion and the resilient tongues being insertable from behind into the opening of the mounting plate for mounting purposes, and the locking protrusions thereby locking in place with the front edge of the opening;
   wherein the fastening element is formed by a sleeve that is insertable from the front side of the mounting plate into the opening of the mounting plate, and cooperates with the fastening means of the fastening protrusion.

2. The combination according to claim 1, wherein the sleeve comprises one cut-out per tongue.

3. The combination according to claim 2, wherein the sleeve is configured in the manner of a bayonet lock, the fastening means of the fastening protrusion being formed by a plurality of nipples which cooperate with corresponding recesses of the sleeve and protect the sleeve against any falling out in the inserted state locked by rotation.

4. The combination according to claim 3, wherein the sleeve is provided on the cut-outs with wedge-shaped extensions which tend to press the tongues against the edge of the opening during rotation.

5. The combination according to claim 1, wherein the sleeve comprises a decorative ring.

6. The combination according to claim 5, wherein the decorative ring serves as a support against the front side of the mounting plate.

7. The combination according to claim 6, wherein the decorative ring comprises grooves serving to accommodate the locking protrusions.

8. The combination according to claim 7, wherein the grooves are spiral-shaped in the radial extension of the decorative ring and tend to press the locking protrusions in a radial direction outwards upon rotation of the sleeve.

9. The combination according to claim 1, wherein the tongues are evenly arranged and distributed over the edges of the opening.

10. The combination according to claim 9, wherein the housing exactly comprises four tongues.

11. The combination according to claim 1, further comprising a plurality of threaded pins seated in the housing, which can be moved out of the housing top side by rotation and serve to support the housing top side on the back side of the mounting plate.

12. The combination according to claim 1, further comprising the mounting plate.

13. The combination according to claim 12, wherein the opening is a bore.

14. The combination according to claim 12, wherein the sleeve has an outer diameter which shows little play relative to the opening.

* * * * *